United States Patent [19]

Ichikawa et al.

[11] Patent Number: 4,528,688

[45] Date of Patent: Jul. 9, 1985

[54] CONTINUOUS SPEECH RECOGNITION METHOD

[75] Inventors: Akira Ichikawa, Musashino; Akio Komatsu, Kodaira; Yoshiaki Asakawa, Kawasaki, all of Japan

[73] Assignee: Hitachi, Ltd., Tokyo, Japan

[21] Appl. No.: 601,957

[22] Filed: Apr. 19, 1984

Related U.S. Application Data

[63] Continuation of Ser. No. 316,643, Oct. 30, 1981, abandoned.

[30] Foreign Application Priority Data

Nov. 12, 1980 [JP] Japan ................................. 55-158297

[51] Int. Cl.³ .............................................. G10L 1/00
[52] U.S. Cl. .................................................... 381/43
[58] Field of Search ................................. 381/41-50; 364/513, 513.5

[56] References Cited

U.S. PATENT DOCUMENTS

| | | | |
|---|---|---|---|
| 4,059,725 | 11/1977 | Sakoe | 179/1.5 D |
| 4,060,694 | 11/1977 | Suzuki et al. | 179/1.5 D |
| 4,100,370 | 7/1978 | Suzuki et al. | 179/1.5 D |
| 4,156,868 | 5/1979 | Levinson | 179/1.5 D |

Primary Examiner—E. S. Matt Kemeny
Attorney, Agent, or Firm—Antonelli, Terry & Wands

[57] ABSTRACT

This speech signal recognition system compares the two-dimensionals pattern (time sequence of feature vectors) of an unknown signal to prestored standard references patterns for recognition, thus forming a corresponding two-dimensional comparison pattern of points of elemental Hamming distance differences. The sum of the pattern point distances is the similarity measure. To improve accuracy, partial patterns are selected (or "masked") and tested sequentially, and the point values weighted relative to their location within the mask. The mask may be rectangular or oblique.

6 Claims, 6 Drawing Figures

CONTINUOUS SPEECH RECOGNITION METHOD

This is a continuation of application Ser. No. 316,643, filed Oct. 30, 1981, abandoned.

BACKGROUND OF THE INVENTION

1. Field of the Invention

This invention relates to a speech recognition method, and more particularly to a continuous speech recognition method for recognizing phonemes in continuous speech.

2. Description of the Prior Art

Heretofore, in order to recognize continuous speech in a phonemic unit, the following methods have been employed:

(1) As the standard patterns of phonemes, feature vectors which are composed of the typical spectral information of the corresponding phonemes or the information of "voiced"/"voiceless" are prepared for the respective phonemes, whereupon an input speech pattern is analyzed into frames at predetermined intervals (hereinbelow, called "frame intervals") so as to examine the matching of each frame with the standard patterns.

The phoneme corresponding to the standard pattern which is matched best as the result of the examination is presumed to exist at that point of time. Matching results at the preceding and succeeding points of time are also taken into account, whereupon the input speech pattern is finally decided.

(2) The standard patterns of phonemes are expressed as time series of the feature vectors, thereby to introduce the time structures of the respective phonemes into the standard patterns. Thus, an input speech pattern is analyzed into frames at predetermined intervals, the processing (termed "segmentation") of regarding phonemes of similar characters as one phonemic section collectively is carried out, and each segment is examined on the matching with the standard patterns in which the time structures are introduced.

The phonemic section corresponding to the time series of the standard pattern which is matched best as the result of the examination is decided to be the input speech pattern.

The method (1), however, has the disadvantage that information on a time structure which the input speech pattern possesses cannot be fully exploited. On the other hand, the method (2) is ameliorated in this respect, but it has the disadvantage that the execution of the segmentation at high precision is difficult. It has consequently been impossible to attain a satisfactory recognition rate with either the method (1) or (2).

As a method for eliminating the disadvantages of the methods (1) and (2) and utilizing the merits thereof, there has been proposed a method in which standard patterns having time structures are prepared in advance as in the method (2), and using the known continuous DP (Dynamic Programming) matching method (refer to the official gazette of Japanese Patent Application Publication No. 55-2205) and while an input speech pattern is kept matching continuously without executing the segmentation, the matching between a part of the input speech pattern and each of the prepared standard patterns is examined. (refer to Japanese Patent Application No. 54-91283)

In this case, the restriction on nonlinearity of time structure of speech is loose. Therefore, even a part which shows good similarity is sometimes processed so as to beyond the reasonable variation range of a time axis. This has led to the problem that the misrecognition rate cannot be made sufficiently small.

SUMMARY OF THE INVENTION

This invention has for its object to provide a matching method which is most suited to properties inherent in the short-duration patterns of phonemes, while keeping the excellent nature of the aforecited method that examines the matching with each standard pattern without executing the segmentation, whereby continuous speech is permitted to be precisely recognized in phonemic unit.

In order to accomplish the object, according to this invention, a two-dimensional mask including a plurality of analytical points is used as the unit of matching on a matching region, thereby to realize the most suitable matching for the properties of phonemes.

DETAILED DESCRIPTION OF THE PREFERRED EMBODIMENTS

The principle of this invention will be described with reference to FIG. 1.

Figure 1:
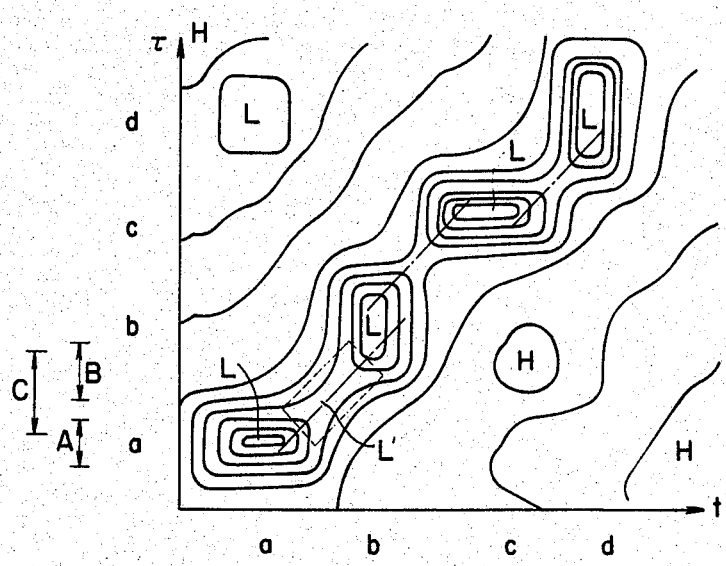
FIG. 1 is a diagram showing as a contour map the distribution of similarities between the predetermined analytical points of a standard pattern and an input pattern.

In FIG. 1, the axis of the abscissa is taken as the time axis of an input speech pattern and the axis of the ordinate as the time axis of a standard pattern, and the distances between the input speech pattern and the standard pattern at various analytical points (frames) are indicated in the form of contour lines, the distances having been obtained in such a way that the input speech pattern composed of a chain of phonemes a, b, c and d and the standard pattern corresponding thereto are subjected to frame analyses at fixed frame intervals (for example, about 10 milliseconds) of the respective time axes.

In FIG. 1, the feature vector $\vec{X}(t)$ of the input speech pattern at an analytical point t on the axis of abscissa and the feature vector $\vec{Y}(\tau)$ of the standard pattern at an analytical point $\tau$ on the axis of ordinate shall be expressed as follows:

$$\left. \begin{array}{l} \vec{X}(t) = \{x_1(t), x_2(t), \ldots, x_n(t)\} \\ \vec{Y}(\tau) = \{y_1(\tau), y_2(\tau), \ldots, y_n(\tau)\} \end{array} \right\} \quad (1)$$

At this time, the degree of similarity between both the patterns can be expressed as follows by employing, for example, distance values:

$$d(t, \tau) = |\vec{X}(t) - \vec{Y}(\tau)| = \left[ \sum_{i=1}^{n} \{x_i(t) - y_i(\tau)\}^2 \right]^{\frac{1}{2}} \quad (2)$$

It is needless to say that correlation values and other various quantities can also be employed for the degree of similarity, and that the method of this invention is applicable to all the cases.

The contour line distribution in FIG. 1 indicates that when the distance between both the patterns is the greatest, the similarity is the lowest, in parts corresponding to H, and that the distance values decrease successively in the order of contour lines down to parts corresponding to L.

It is understood from FIG. 1 that, the part corresponding to L where the distance value becomes the smallest forms a rectangle whose longitudinal direction is parallel to the axis of abscissa or the axis of ordinate, even when the time axes are expanded or contracted nonlinearly (for example, the section of existence of the phoneme b on the axis of abscissa and the section of existence of the phoneme b on the axis of ordinate), and that the transient part between phoneme similar to each other (for example, the part intermediate between the phoneme a and the phoneme b) forms a rectangle whose longitudinal direction has an inclination of approximately 45° as indicated by a dotted line.

In a consonant (for example, a stop P) or a semivowel (for example, Ya), the fluctuation of its acoustic characteristic with time has information as a phoneme. Therefore, the nonlinear expansion or contraction of the time structure attributed to a difference in the speed of uttering the sound at each utterance is small. As a result, the part corresponding to L' where the distance value becomes the least forms the rectangle having the inclination of approximately 45°.

In contrast, in the steady portion of a phoneme or pause (considered to be a kind of steady state), the above-mentioned expansion or contraction the time structure at each utterance is known to be relatively great.

This can also be known from the fact that the longitudinal directions of the rectangles indicative of the steady portions in FIG. 1 are different, so one-dot chain lines deviate from one another as illustrated in the figure.

In case of recognizing phonemes in continuous speech, a standard pattern to be used is not a pattern of a succession of phonemes (for example, a pattern in word unit) such as /abcd/ shown in FIG. 1, but an individual phoneme /a/, /b/, . . . or /d/, a pattern of a succession of at most two phonemes /ab/ or a transient part of the pattern is used. For example, the section of a phoneme or phonemes constituting the standard pattern as indicated by A, B or C in FIG. 1 is used as the standard pattern. From these facts, the following are understood:

(1) With such unit, the nonlinear expansion or contraction of the time axis is not essentially important.

(2) Regarding vowels etc. for which it is important to be recognized in the steady portions of phonemes, it is desirable in points of detecting the steady portion and absorbing local fluctuations such as noise, to estimate similarity in a fixed rectangular range, not to examine the mere matching between frames.

(3) Regarding consonants and semivowels for which it is important to have the matching examined using transient parts chiefly, it is desirable for stable detection of a phonemic property and for stability against external noise, to examine the matching over a fixed range (inclined range) surrounded with the dotted line in FIG. 1.

By exploiting such facts, this invention provides a matching method which detects phonemes successively from within continuous speech without performing the segmentation.

Figure 2:
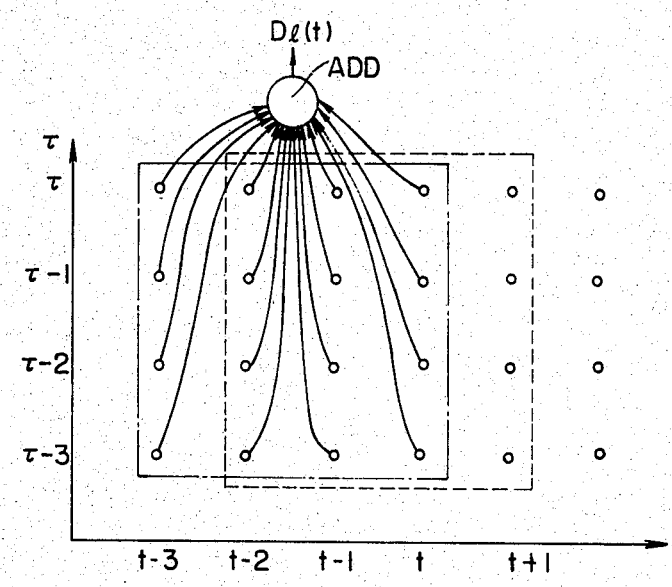
FIG. 2 is a diagram showing the procedure of evaluating a similarity with a rectangular mask.

FIG. 2 is a diagram for explaining this invention by taking as an example a case where a rectangular mask for matching (hereinbelow, simply called "rectangular mask") is set at 4×4 frames. (When the frame interval is set at approximately 10 ms, the length of one side of the rectangle should desirably be approximately 3-6. This corresponds to approximately 3×10-6×10 ms in terms of time.) In a section within a one-dot chain line in FIG. 2, the similarities between the frames (t−3) to t of an input speech pattern and the frames (τ−3) to τ of a standard pattern 1 are added up to obtain $D_l(t)$ corresponding to distance values. When the next frame (t+1) is put in, the rectangular mask is moved as indicated by a dotted line, and $D_l(t+1)$ is obtained in the same way. Thereafter, similar processings are successively executed. Similar processings are carried out for the respective standard patterns l (l=1, 2, . . . and L) of phonemes. When the outputs $D_l$ assume minimum values at or below a prescribed threshold value in response to several phonemes l, that phoneme l among them which provides the least value is recognized to have been put in.

Figure 3:
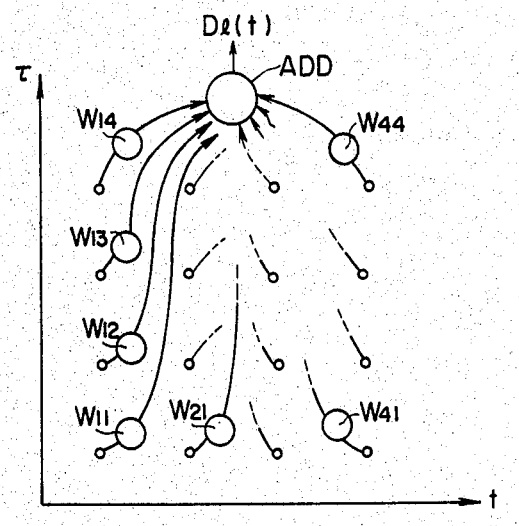
FIG. 3 is a diagram showing the procedure of allotting predetermined weights to the corresponding points of the rectangular mask in FIG. 2 and then finding a criterion for estimating the similarity.

In the description of FIG. 2, the corresponding points within the mask are estimated with equal weights only. More generally, however, it is desirable to allot the optimum weights to the respective corresponding points and then estimate them. In the continuous speech, the steady portion shortens especially when the uttering speed is high. Accordingly, such weighting as estimating the stable central part high is desirable. FIG. 3 is a diagram for explaining such arrangement. Although the illustration is partly omitted, weights $w_{ij}$ (i, j=1, 2, 3 and 4) are allotted to the respective points, whereupon similarities $w_{ij} \cdot d(i, j)$ are added up to obtain $D_l(t)$.

Figure 4:
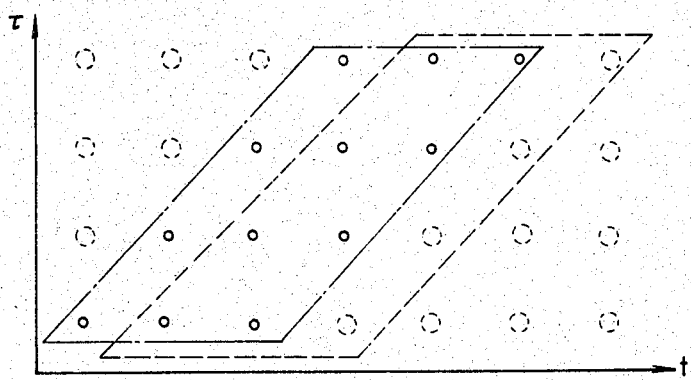
FIG. 4 is a diagram showing the positional relationship between an inclined mask and corresponding points within the mask.

When the weights $w_{ij}$ are introduced in this manner, the processing of the inclined sections for estimating consonants and transient parts is permitted with the same technique merely by allocating the values of $w_{ij}$ so that the inclined sections may be estimated. Referring by way of example to FIG. 4, in a frame t, $D_l(t)$ may be calculated with the same technique as described above by allotting predetermined weights to the respective corresponding points of an inclined mask for matching (hereinbelow, simply called "inclined mask") enclosed with a one-dot chain line. In the subsequent frame (t+1), a similar processing may be executed by allotting predetermined weights to the respective corresponding points of an inclined mask enclosed with a dotted line. In FIG. 4, marks which appear as a solid circle indicate the corresponding points which ought to be processed as predetermined, while marks which appear as a dotted circle indicate the corresponding points which ought to be neglected by making the weights $w_{ij}$ zero. Since the relation of additions in FIG. 4 is the same as in the case of FIG. 3, it is omitted from the illustration.

In the case where, as explained with reference to FIG. 2, a new frame has entered in the input and $D_l(t+1)$ corresponding to the summation of similarities at the time $(t+1)$ is evaluated by moving the mask, some of the corresponding points are common to the corresponding points in the processings for evaluating $D_l(t)$, and wasteful processings are involved. In such a simple case where the weights are constant, the repeated processings can be avoided by evaluating $D_l(t)$ in such a way that each time new inputs in the vertical direction are received, points corresponding to their frames are processed, that the results are retained for a required period of time and that only necessary ones of them are added. However, in case of supposing processings as illustrated in FIG. 4, the relation of weights changes complicatedly every input operation even when the weights are simple. Therefore, it is more desirable that processings are first executed in the oblique direction, that the results are once retained and that the addition of the whole range is executed.

In case where a standard pattern has the property of steadiness as in vowels, the differences of the feature vectors of the respective frames of the standard pattern are small. Therefore, the estimation of similarities with the inclined mask as shown in FIG. 4 is substantially approximate to the evaluation with a rectangular mask except that as a position comes to the peripheral part away from the central part of the mask, the number of corresponding points decreases relatively, so the signal-to-noise ratio lowers. In addition, in continuous speech, the steady portion is shorter than in a phoneme uttered singly. Therefore, it is desirable to have an estimation employing a mask which applies a greater weight to the central part of a noted range on the input speech side. With the method employing the inclined mask in FIG. 4, the number of times of use of the respective frames of the standard pattern for $D_l(t)$ corresponding to the summation of the similarities is constant, whereas a large number of times of use of speech pattern side is applied to the central part in the noted range, so that the desirable weight is automatically applied onto the input speech pattern side.

The processing steps described above are summed up as illustrated in FIG. 5, When all the weights in the lateral direction are made common, the weights on the standard pattern side can also be applied, and simultaneously, the oblique direction processings can be facilitated. This procedure is indicated with equations as follows:

Using $d(t, \tau)$ obtained with equation (2) mentioned before, $$\Delta(t, \tau = 0) = 0 \qquad (3)$$

$$\Delta(t, \tau) = \Delta(t - 1, \tau - 1) + w_{t\tau} \cdot d(t, \tau) \qquad (4)$$

$$(\tau = 1, \ldots, T)$$

$$\delta(t) = \Delta(t, T) \qquad (5)$$

Figure 5:
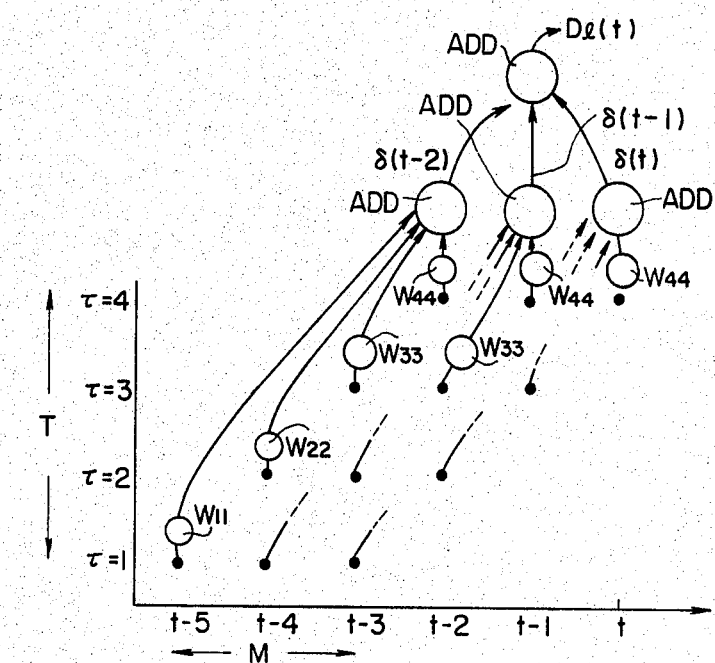
FIG. 5 is a diagram showing the procedure of allotting predetermined weights to the corresponding points of the inclined mask in FIG. 4 and then finding a criterion for estimating the similarity.

$T$: standard pattern length ($T = 4$ in FIG. 5)

$$D_l(t) = \sum_{k=0}^{M-1} \delta(t - k) \qquad (6)$$

$M$: number of oblique lines used for estimation ($M$ is a value of 1–3 or so)

Hereunder, a practicable embodiment of this invention will be described.

Figure 6:
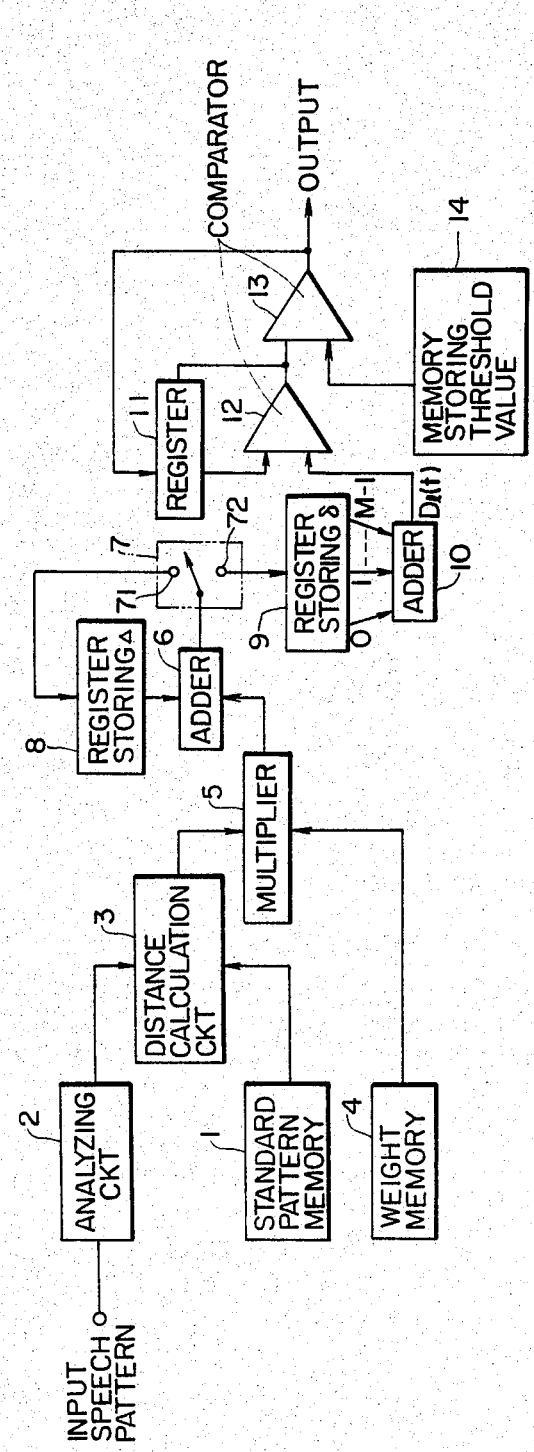
FIG. 6 is a diagram showing the circuit block arrangement of an embodiment of this invention.

FIG. 6 is a block arrangement diagram of a specific circuit for performing this invention. In the ensuing description, one standard pattern will be referred to for the sake of brevity. In order to check up with a large number of standard patterns (L patterns), the apparatus may be multiplexed by preparing memories and registers in correspondence with the number of standard patterns and time-sharing a single distance calculation circuit 3, one of L decision outputs being selected.

Referring to FIG. 6, a speech pattern received as an input is converted into feature vectors at regular intervals (of, for example, 10 ms) by an analyzing circuit 2. Feature parameters are the outputs of band-pass filters which are arranged at logarithmically equal intervals between 300 and 3600 Hz. Alternatively, the feature parameters may be PARCOR coefficients etc. representative of the features of speech. All data (here, T data) of a standard pattern are read out from a standard pattern memory 1, and the feature vector of the input speech is converted into the distance $d(t, \tau)$ of Equation (2) by the distance calculation circuit 3. (Although Equation (1) is used here, the essence of this invention does not change at all even when the equation for the degree of similarity is replaced with any other appropriate one, depending upon the kind of the parameter of the feature vector.) The distance $d(t, \tau)$ and a weight $w_{t\tau}$ (differing in accordance with standard patterns) corresponding to $\tau$ as read out from a weight memory 4 are multiplied by a multiplier 5. Thereafter, the multiplied result and the corresponding content $\Delta(t-1, \tau-1)$ of a register for storing $\Delta$, 8 are added as in Equation (4) by an adder 6.

The operations of Equation (4) are executed in the order of $\tau = 1, 2, \ldots$ and T. At $\tau \neq T$, a switch 7 is kept connected on the side of a terminal 71, and the output of the adder 6 is stored into that position of the $\Delta$ storing register 8 which corresponds to $\tau$.

When $\tau = T$ is reached, the switch 7 is connected onto the side of a terminal 72, and the output of the adder 6:

$$\delta(t) = \sum_{\tau=1}^{T} \Delta(t, \tau)$$

is stored into the first shift register section of a register for storing $\delta$, 9.

The $\delta$ storing register 9 consists of M shift register sections. When the output $\delta(t)$ is received, contents $\delta(t-1), \ldots, \delta(t-M+1)$ and $\delta(t-M)$ having been stored till then shift every content in succession, and the content $\delta(t-M)$ overflows and disappears from the shift register.

In the above operations, at $\tau = 0$, 0 (zero) is stored into that position of the $\Delta$ storing register 8 which corresponds to $\tau = 0$, and it is utilized as a data at $\tau = 0$ in the next frame $(t+1)$.

The M data stored in the $\delta$ storing register 9 are added in an adder 10 in accordance with Equation (6), to evaluate $D_l(t)$ (l=1).

On the other hand, a register 11 stores therein the least value of $D_l(t')$ at $t'$ ($t' < t$) among frames received till then, and this value is compared with $D_l(t)$ in a comparator 12. When, as the result of the comparison, $D_l(t)$ is decided to be the new least value, it is stored into the register 11 and is also compared in a comparator 13 with a threshold value read out from a memory for storing threshold values, 14.

When, as the result of the comparison, the least value $D_f(t)$ is decided to fulfill an output condition, there is provided the recognition result that the input speech pattern in the frames $(t-M+1)$ to $t$ is the standard pattern read out from the memory 1.

When such processings are executed, the matching of the input speech pattern with the standard patterns is examined while the input speech pattern is kept matching continuously in time series.

It is also possible to execute the above operations by means of a microprocessor.

As set forth above, according to this invention, phonemes in speech which is continuous in time can be stably detected without performing the segmentation. This is greatly effective.

We claim:

1. A continuous speech recognition method comprising the steps: analyzing a continuous input speech pattern in time series, setting a predetermined two-dimensional mask for successively appointing a one unit region for matching which includes a plurality of analytical points of each of a standard pattern analyzed in time series in advance and the input speech pattern, calculating a parameter corresponding to a degree of similarity between said standard pattern and said input speech pattern within said one unit region on the basis of analytical results at said plurality of analytical points of said standard pattern and aid input speech pattern within said mask including the operations of allotting predetermined weights to respective values corresponding to differences of the analytical results at said plurality of analytical points of said standard pattern and said input speech pattern within said two-dimensional mask, and comparing said parameter corresponding to said degree of similarity with a predetermined threshold value, whereby said input speech pattern is successively recognized in time series.

2. A continuous speech recognition method as defined in claim 1, wherein said predetermined weights are assigned within said one unit region such that at least selected interior points are assigned greater weights than exterior parts of the region.

3. A continuous speech recognition method as defined in claim 2, wherein said one unit region is inclined.

4. A continuous speech recognition method comprising the steps: analyzing a continuous input speech pattern in time series at time separated analytical points, setting a predetermined two-dimensional mask for successively appointing a one unit region for matching which includes a plurality of the time separated analytical points from an input speech pattern analyzed in time series, calculating a distance parameter corresponding to a degree of similarity between said standard pattern and said input speech pattern within said one unit region from a mathematical analysis of a plurality of the time separated analytical points of said standard pattern and said input speech pattern within said region including operations of alloting predetermined weights to distances calculated at said plurality of analytical points of said standard pattern and said input speech pattern within said two-dimensional mask, and comparing said distance parameter corresponding to said degree of similarity with a predetermined threshold value, whereby said input speech pattern is successively recognized in time series.

5. A continuous speech recognition method as defined in claim 4, wherein said predetermined weights are assigned within said one unit region such that a greater weight is assigned to an interior part of the region than an exterior part of the region.

6. A continuous speech recognition method as defined in claim 5, wherein said region is inclined.

* * * * *